Oct. 29, 1963

G. O. GARIS ETAL 3,108,520

VARIABLE COMPACTION

Filed Aug. 1, 1960

INVENTOR.
GORDON O. GARIS
BY ARCHIE O. WILLIAMSON
Cochran & Cochran
ATTORNEYS

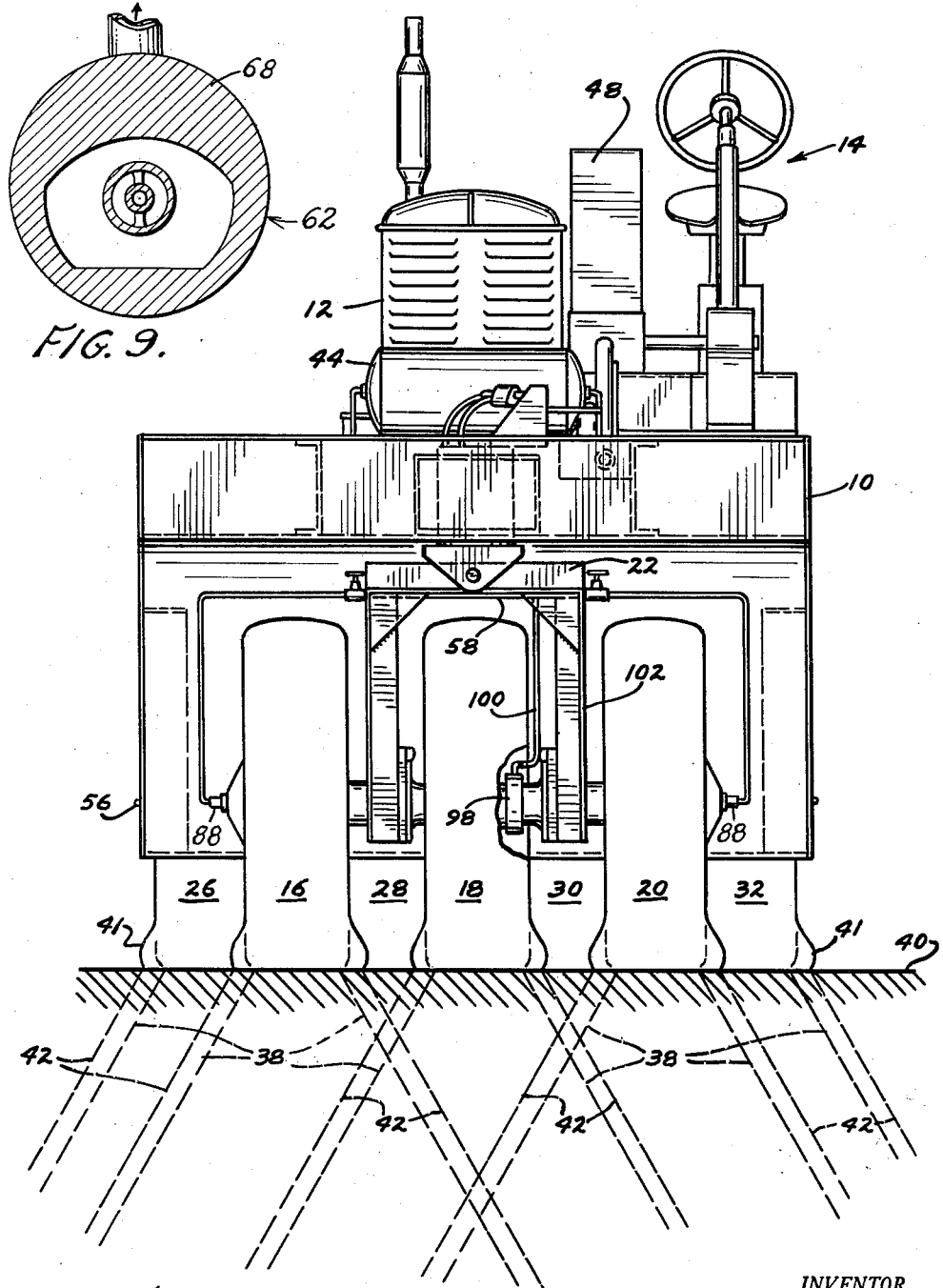

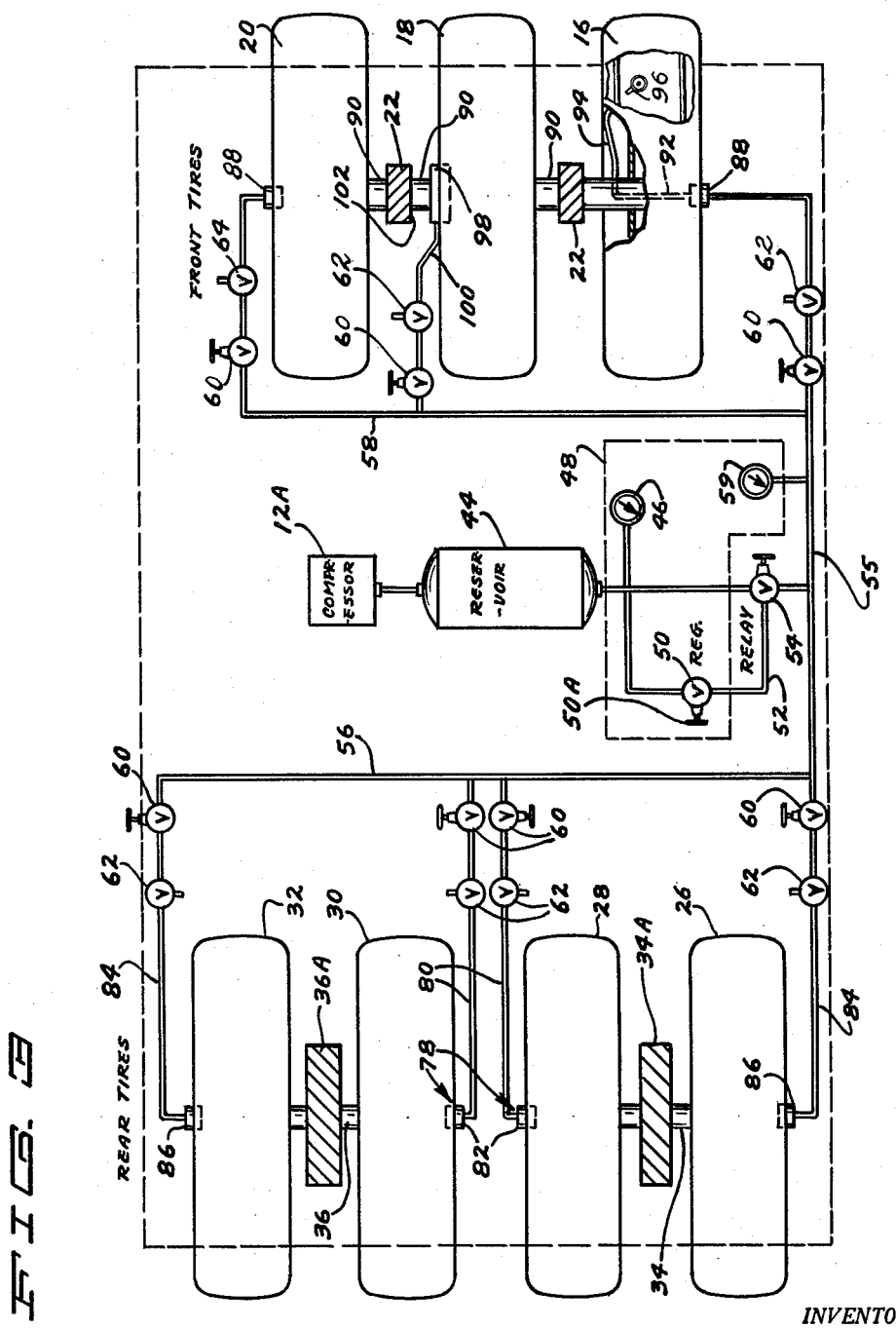

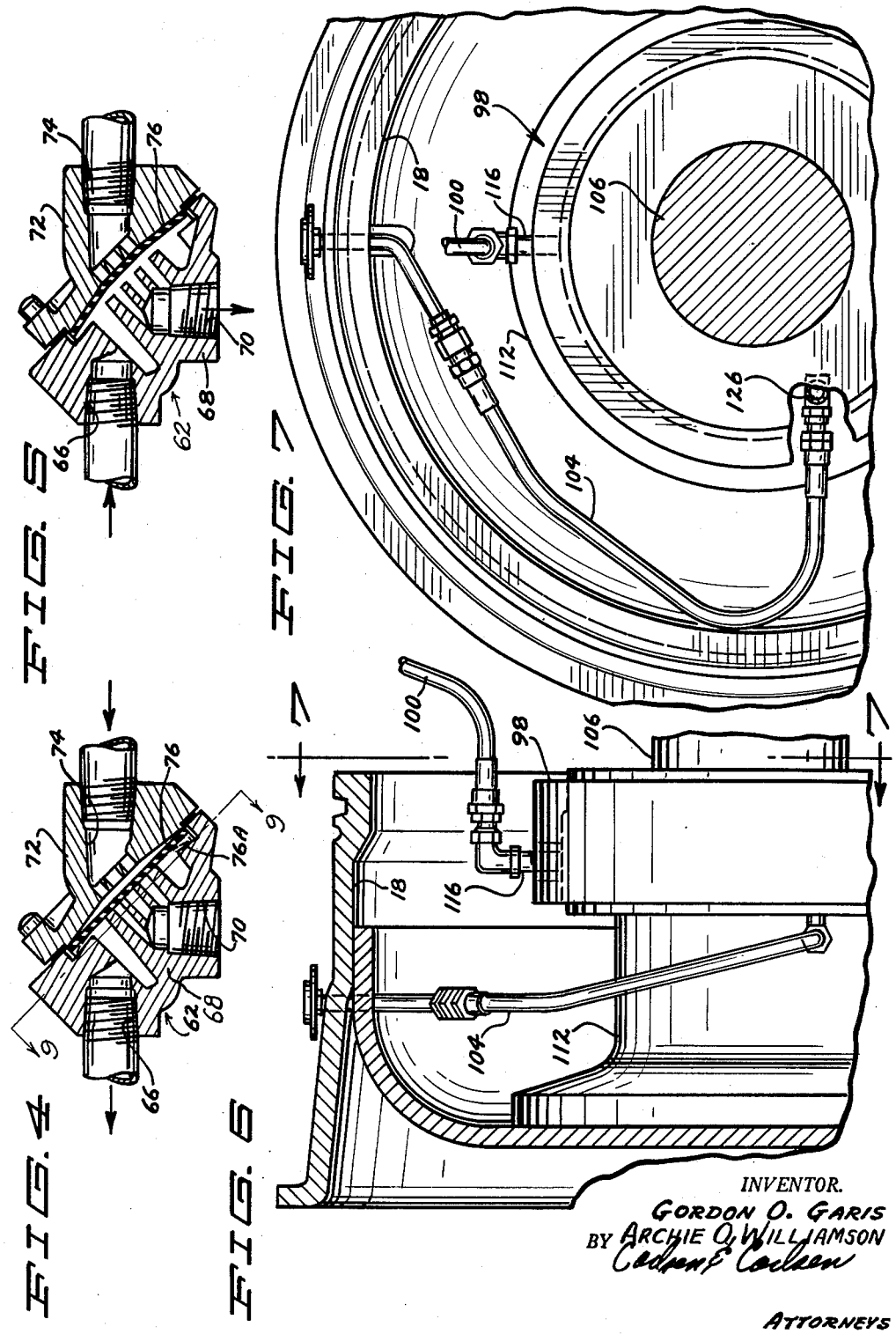

Oct. 29, 1963
G. O. GARIS ET AL
3,108,520
VARIABLE COMPACTION
Filed Aug. 1, 1960
5 Sheets-Sheet 5
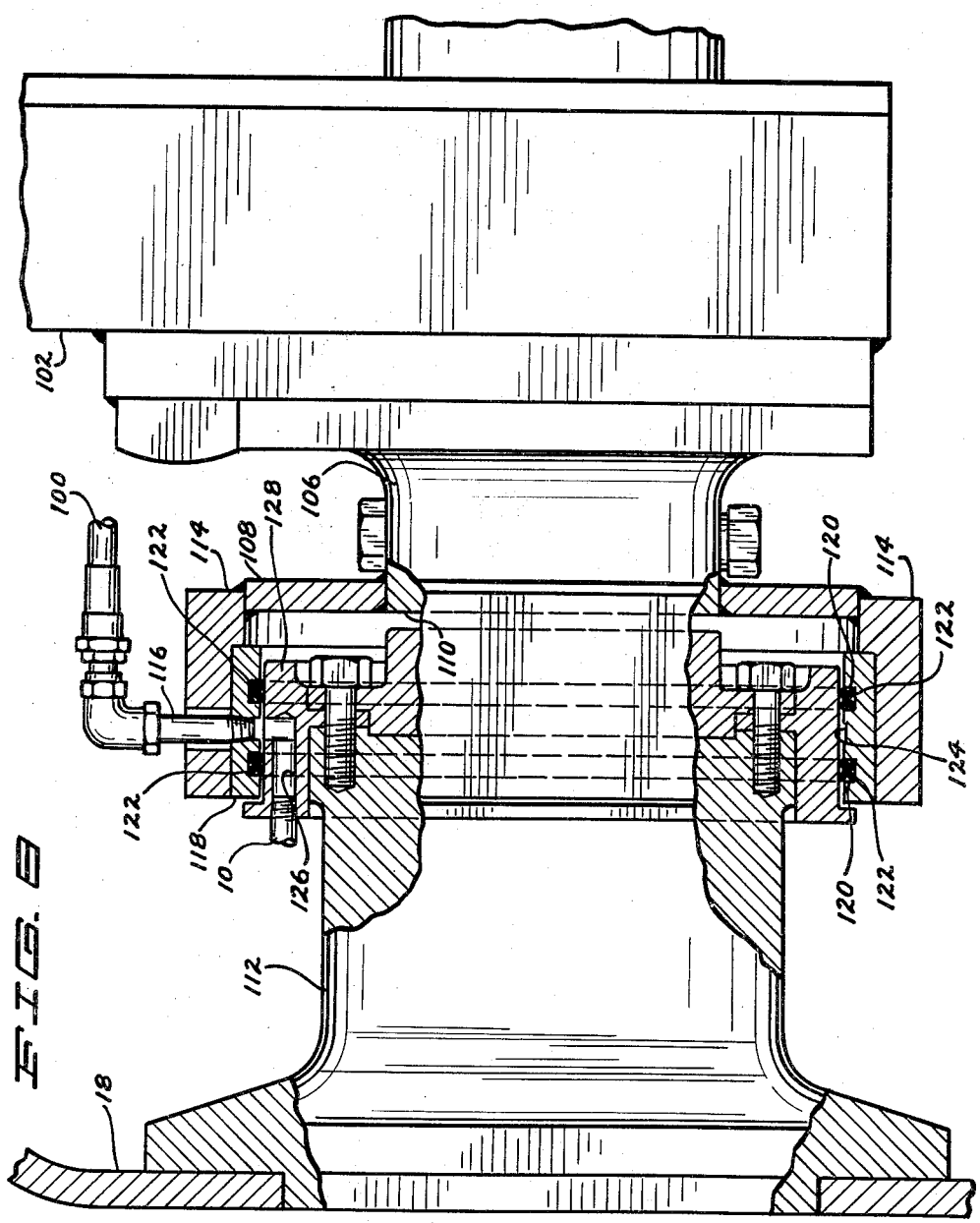
INVENTOR.
GORDON O. GARIS
BY ARCHIE O. WILLIAMSON
Coulsen & Coulsen
ATTORNEYS

United States Patent Office 3,108,520
Patented Oct. 29, 1963

3,108,520
VARIABLE COMPACTION
Gordon Owen Garis, Golden Valley, and Archie O. Williamson, Minneapolis, Minn., assignors to Bros Incorporated, Minneapolis, Minn., a corporation of Minnesota
Filed Aug. 1, 1960, Ser. No. 46,496
6 Claims. (Cl. 94—50)

This invention relates to road compactors and the like and particularly to such compactors which change their compacting force while being operated.

In constructing roads, airport runways, and the like, it is desirable that the machines which compact the supporting beds begin the compacting operation with a relatively low compacting force and finish with a relatively high compacting force. Previous to this invention, the compactor operators would stop the compactor and change the pressure in the various pneumatic compacting tires with each tire having its pressure changed individually. It should be readily apparent that such an operation would be time-consuming. Since the compactors operate at a high hourly cost rate, such operations are expensive.

The present invention provides a compactor which can selectively change its compacting force while "on the run" from controls located at the operator's station. Since the usual compactor has a plurality of axially aligned compacting wheels sharing the axle, improved means are provided for changing the tire pressure of the center tires.

Accordingly, it is the prime object of the present invention to provide a compactor capable of varying the compaction while being operated.

It is a further object of the present invention to provide improved pressure line access means for pneumatic compacting tires.

These and other more detailed and specific objects will be disclosed in the course of the following specification, reference being had to the accompanying drawings, in which—

FIG. 2 is an enlarged front elevational view of the FIG. 1 machine and showing the limit lines of compaction for two tire pressures.

FIG. 3 is a diagrammatic plan view of the air pressure system as used in the FIG. 1 machine.

FIG. 4 is a vertical sectional view of a pressure actuated valve used to control the tire pressure of the FIG. 1 machine and illustrated in the pressure increasing and holding position.

FIG. 5 is a vertical sectional view of the FIG. 4 valve but shown in a pressure decreasing position.

FIG. 6 is a combined partial elevational and sectional view of the improved rotary seal for use with center tires of compactors for showing the pneumatic connections thereof.

FIG. 7 is a vertical sectional view taken in the direction of the arrows along the line 7—7 in FIG. 6 and showing the air line connection between the improved rotary seal and the tire.

FIG. 8 is an enlarged cut-away elevational view of the improved rotary seal as would be seen by viewing same in the cut-away portion of FIG. 2 and showing the constructional details thereof.

FIG. 9 is a cross-sectional view taken on the line 9—9 of FIGURE 4.

Figure 1:
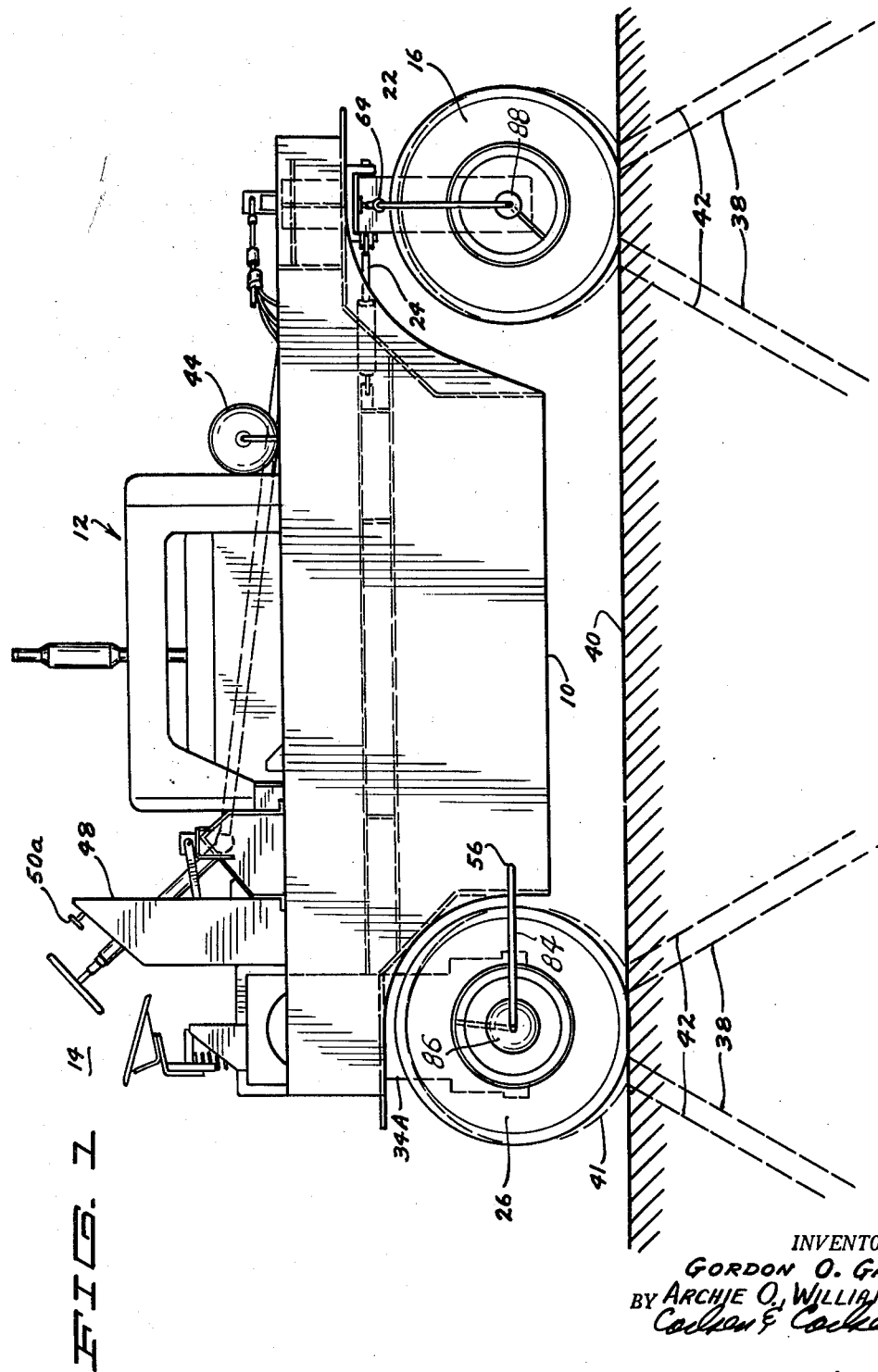
FIG. 1 is a side elevational view of a compactor embodying the teachings of the present invention and showing the limit lines of compacting for two tire pressures.

Referring more particularly now to the appended drawing like numbers denote like parts and structural features in the various views. The compactor comprises a body portion 10 which has a suitable cavity for holding ballast and is powered by a suitable internal combustion engine 12 having an air compressor (not shown) integrally associated therewith. An operator's position 14 is provided at the rear of the compactor and has the usual control means for operating the machine. There are three front wheels 16, 18 and 20 rotatably secured to an axle held by the bolster 22 which is rotatably secured to the body portion 10 in the usual manner. Hydraulic rams 24 are operatively connected to the bolster for steering the compactor. There are four rear wheels 26, 28 and 30 and 32 which are respectively supported in pairs on the two independent axles 34 and 36 (FIG. 3) suitably secured to the body 10 in the usual manner as by the depending axle support members 34A and 36A.

With more particular attention to FIGS. 1 and 2, the outer limit lines of compaction for two tire pressures and a constant compactor weight are schematically illustrated. With a high tire pressure, there is less ground engaging contact resulting in the compaction having the limits for each tire as indicated by the lines 38 and which also indicate the area of the roadway 40 subsurface receiving the high compacting force. With the tires somewhat de-deflated, as indicated by the lines 41, the lines 42 indicate the limits of the same total compacting force spread over a greater area with respect to the compaction indicated by the lines 38. In operating the compactor to provide a road bed, the lesser compacting force is initially used and the compacting force is gradually increased, step-by-step, until the greatest compacting force is obtained to provide a hard compacted surface.

With more particular reference to FIG. 3, the diagrammatically illustrated compressor 12A operated by the engine 12 (FIG. 1) is communicatively connected to the usual accumulator or reservoir 44 for providing pressurized air thereto. The pressure maintained in the reservoir 44 is indicated by a suitable pressure gauge 46 mounted on the control box 48 adjacent the operator's position 14 as shown in FIGS. 1 and 2. A manually-controlled pressure-regulating valve 50 is installed in the control box 48 and reduces the pressure from the tank 44 to any selected pressure in the line 52 for controlling the pilot or relay valve 54. The valve 50 may be of the spring loaded type with a manually actuated control lever 50A for varying the spring tension thereof to change the pressure in the line 52. The relay valve 54 is constructed such that the pressure on the line 52 controls the downstream pressure from the reservoir in the line 55 leading to the pneumatic headers 56 and 58. It is believed that the operation and construction of pilot controlled or relay valves are sufficiently well-known as to require no further description herein.

The header 56 is communicatively connected through the manual actuated valve cocks 60 to the rear tires 26, 28, 30 and 32. The valves 60 are provided to facilitate replacement of any one of the rear tires as may be necessary or desired. In series communicative relation with each of the valves 60 there is provided a so-called "dump" valve 62 which is operative as later described to make the tire pressure substantially equal to the header 56 pressure. The three front tires 16, 18 and 20 are similarly communicatively connected to the header 58 through the respective dump valves 62 and valve cocks 60.

Referring now to FIGS. 4 and 5, the dump valves will now be described. Each valve has a delivery port 66 communicatively connected to one of the compactor tires and is formed in the body portion 68 of the valve. An exhaust port 70 provides communicative connection to the atmosphere for exhausting air from the respective tires for decreasing the pressure thereof to decrease the compacting force as described. A cover 72 is suitably bolted to the body 68 and has a supply port 74 formed therein and communicatively connected to one of the headers 56 or 58. The valving action is provided by the diaphragm 76 as actuated by the pressure differential between the ports 66 and 74. When the pressure provided at the port 74 is greater than the port 66 pressure, the diaphragm 76 is forced to the FIG. 4 illustrated position in which the exhaust port 70 is sealed from the rest of the valve. The rim of the diaphragm is deflected, as indicated by the dotted lines 76A, for providing a direct passage therearound permitting air to flow from port 74 to 66. When the air pressure in the port 66 exceeds the port 74 air pressure by about 5 p.s.i., the pressure differential acts to deflect the diaphragm 76 to the FIG. 5 illustrated position wherein the supply port is sealed from the rest of the valve and the air is permitted to flow from the port 66 to the atmosphere through the exhaust port 70. As the tire pressure reaches a magnitude approximately one p.s.i. below that of the port 74 pressure, it permits the diaphragm 76 to reseal the exhaust port 70 from the rest of the valve stopping further flow of air within the valve as shown in FIG. 4. In the latter position, the diaphragm 76 rim is not deflected to the dotted line position of FIG. 4 because the pressure differential between line 66 and 74 is not sufficient to bend the material of the diaphragm 76. Under these conditions, the diaphragm prevents flow of air between any of the ports.

From the above description it should be readily apparent that the respective dump valves automatically cause the respective tire pressures to follow the pressure variations in the headers 56 and 58 as manually controlled by the valve 50 adjacent the operator's position. By combining the above described pressure control system with rotary seals to the various compacting wheels, the compacting force per square inch of tire ground engagement is readily changed by the operator while the compactor is being operated.

The communicative connection between the respective valves 62 and the various compactor tires includes a rotary seal for each of the tires. The rear tires are supported in pairs on independent axles 34, 36 for having their inner ends 78 axially spaced-apart for permitting the two pneumatic lines 80 to be respectively connected to the rotary seals 82 of a suitable known construction and which require access to the end of the axle. The outer two pneumatic lines 84 are respectively connected to the rotary seals 86 on the tires 26 and 32. The front outer two wheels 16 and 20 have like constructed rotary seals 88 for providing a rotating connection between each wheel and dump valve. The seals 82, 86 and 88 can be identically constructed. As shown for the wheel 16, the seal 88 is disposed co-axially with the single axle 90 and includes an axially extending and rotating tube 92 which has a radially outwardly extending portion 94 threadingly engaged with the valve stem 96 for providing communicative connection between the seal 88 and the wheel 16 tire. The wheels 20, 26, 28, 30 and 32 have their respective communicative connections constructed in a similar manner. It may be noted that by mounting the rear tires in pairs, a convenient and inexpensive rotary seal construction is provided for each of the rear tires and not requiring the annular and rotary seal 98 provided for the front center wheel 18.

As best seen in FIGS. 6, 7 and 8 the annular seal 98 is provided with a stationary pneumatic line 100 communicatively connected to a dump valve 62. The stationary portion of the annular seal 98 is supported by the bolster 22 left-hand leg 102. The rotating connection from the seal 98 to the tire on the wheel 18 is provided by the tube 104 which rotates with the wheel.

As best seen in FIG. 8, a stationary hub 106 is suitably attached to the bolster leg 102 and has an annular plate 108 welded to its outer periphery at the hub end closely-adjacent the rotating hub 112 of the wheel 18. An apertured and annular band 114 of steel is welded to the outer periphery of the annular plate 108 and mounts the nipple 116 which is communicatively connected to the tube 100. An annular bronze bearing 118 is disposed radially inside the band 114 and is threadingly engaged to the nipple 116. Two annular and radially inwardly opening grooves 120 are provided in the bearing 118 for receiving the two annular air-sealing members 122. A third annular groove 124 is provided in the bearing 118 axially adjacent the radial inward end of the nipple 116 to provide a circumferentially continuous air passageway on the radial inside surface of the bearing 118 end axially intermediate the seals 122.

The air under pressure within the groove 124 is provided to the pneumatic tube 104 through the port 126 formed in the member 128 which is suitably bolted to the rotating hub 112. In the above described manner the air from the stationary line 100 is provided continuously to the rotating wheel 18 for permitting continuous control over the tire pressure thereof, and thus the compacting force exerted thereby, of the center one of the three front tires.

It is understood that the annular seal 98 may be provided for the inner two tires 28 and 30 of the rear set to provide continuous access thereto for changing the compacting forces exerted thereby. It is preferred, however, that the FIG. 3 illustrated arrangement be used on compactors embodying the present invention. Alternately the seal 98 construction may be used to provide a communicative connection to all of the tires on a compactor.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a compactor having a framework, said framework being adapted to carry sufficient ballast for compaction, front and rear sets of wheels, said front and rear sets each including a plurality of generally coaxial wheels, a resilient air inflatable tire on each wheel, means on said framework rotatably supporting the wheels, the wheels of one of said sets being pivotally mounted for up and down movement relative to said frame whereby the load carried by the tires of said one set will tend to be evenly distributed therebetween when said compactor travels over uneven ground, adjacent tires in each set being spaced axially relatively closely together, air compressor means on said compactor including an accumulator, manually actuated valve means communicatively connected to the accumulator, pressure differential actuated valve means communicatively connected between each of said wheels and said valve means, said pressure differential actuated valve means also communicating with the atmosphere and a movable valve element in each of said pressure differential actuated valve means adapted to move between a first seated position sealing said communication with said atmosphere and a second seated position sealing said communication with said valve means to allow the escape of air from said wheel through said communication with atmosphere when the pressure of said wheel is above the pressure at said valve means, a rotary seal on each wheel including duct means communicatively coupling the seal to the respective tires and a duct means communicatively connecting each seal and each respective pressure actuated valve means such that the manually actuated valve is operative to control the ground engaging area on all of the tires.

2. In a compactor having a body, said body being adapted to carry sufficient ballast for compaction, front and rear sets of wheels, and each of said sets having a plurality of resilient air inflatable compacting tires, means on the body rotatively supporting the wheels, the wheels of one of said sets being yieldably mounted for up and down movement whereby the load will tend to be evenly distributed therebetween, adjacent tires on each of said sets being spaced axially relatively closely together and the tires of said front set being staggered with respect to the tires of said rear set, air compressor means on said body including an accumulator, manually actuated pressure control valve means communicatively connected to the accumulator, pressure differential actuated valve means for each wheel communicating with said pressure control valve means, a rotary seal on each wheel including a rotating radially extending duct means communicatively coupling each seal with its respective tire and a duct means communicating between each of said seals and its corresponding pressure differential actuated valve means such that the manually actuated valve means is operative to simultaneously control the tire pressure for varying the ground engaging area of all of the tires.

3. In a compactor having a body portion with front and rear sets of pneumatic tire compacting wheels, one of the sets having an even number of wheels, a set of independent rear axles on the body and each rotatably supporting two of said wheels in the one set, axle means rotatably mounting the wheels in the front set and being operatively associated with the body portion for pivotal movement about a longitudinal axis, each axle having a rotary seal at both ends, tube means providing fluid communication from each seal to the respective adjacent pneumatic tire, rotary seal means adjacent the center one of the tire on the axle means and being radially outward of the axle means, a transverse pneumatic header adjacent each set of wheels, independent tube means providing a communicative connection between the respective headers and the rotary seals, and a manually controllable fluid pressure system communicatively connected to the headers for changing the tire pressures to vary the compaction forces, pressure differential valve means being interposed between each seal and the headers in each of the respective independent tube means and being responsive to a predetermined pressure differential between the headers and tires to admit air from the header into the tire and further responsive to a reverse pressure differential to communicatively connect the respective tires to the atmosphere for reducing the tire pressure whereby the tire pressures are functions of the manually controlled fluid pressure in the system.

4. In a road compactor having a body, said body being adapted to carry sufficient ballast for compaction, a plurality of rows of earth engaging and compacting wheels supporting said body, the wheels of said rows being axially relatively closely spaced, the wheels of at least one of said rows being mounted in at least one group on wheel support means which is pivotally connected to said framework for movement relative thereto about a longitudinal axis whereby the group may pivot to compensate for uneven earth contours, each of said wheels being provided with an air inflatable tire, means providing a source of compressed air for inflating said tires, a pressure control valve means having an inlet communicatively connected to said compressed air source, and a discharge outlet, a rotary seal at each wheel including a rotating duct means communicatively coupling each seal with its respective tire, duct means communicatively connecting each of said seals with the discharge outlet of said pressure control valve means, and means in said duct means to maintain a constant predetermined pressure and to relieve excess pressure in said tires due to a temporary overload and readmit air when said overload is removed, said wheel support means and said pressure relief means cooperating to provide even compaction by each of the wheels on a relatively uneven earth surface.

5. In a road compactor having a body, said body being adapted to carry sufficient ballast for compaction, at least front and rear sets of wheels, each of said sets having a plurality of resilient, air inflatable, earth compacting tires, means on said body rotatively supporting said wheels, the wheels of at least one of said sets being mounted in at least one group on wheel support means which is pivotally connected to said framework for movement relatively thereto about a longitudinal axis whereby the group may pivot to compensate for uneven earth contours, means providing a source of compressed air for inflating said tires, a pressure control valve means having an inlet communicatively connected to said compressed air source, and a discharge outlet, a rotary seal at each wheel including a rotating duct means communicatively coupling each seal with its respective tire, duct means communicatively connecting each of said seals with the discharge outlet of said pressure control valve means, said duct means including for each set of wheels branch conduits leading from the seals of said set to a common header, the said header being connected to said discharge outlet, and means in said duct means to maintain a constant predetermined pressure and to relieve excess pressure in said tires due to a temporary overload and readmit air when said overload is removed, said wheel support means and said pressure relief means cooperating to provide even compaction by each of the wheels on a relatively uneven earth surface.

6. In a compactor having a body, said body being adapted to carry sufficient ballast for compaction, at least front and rear sets of wheels, each of said sets having a plurality of resilient, air inflatable, earth compacting tires, means on said body rotatively supporting said wheels, the wheels of at least one of said sets being yieldably mounted for up and down movement whereby the load will tend to be evenly distributed therebetween, adjacent tires on each of said sets being spaced axially relatively close together, means for providing a source of compressed air, a pressure control valve means having an inlet communicatively connected to said supply of compressed air, and an outlet, pressure differential actuated valve means for said wheels communicating by conduit means with the said outlet of said pressure control valve means, said pressure differential actuated valve having means for dumping air from said tires when the pressure is reduced by said pressure control valve means and for supplying air to said tires when the pressure is increased, a rotary seal at each wheel including a rotating duct means communicatively coupling each seal with its respective tire, and duct means communicating between each of said seals and said pressure differential actuated valve means such that said pressure control valve means is operative to simultaneously control the tire pressure for varying the ground engaging area of all the tires.

References Cited in the file of this patent

UNITED STATES PATENTS

| | | |
|---|---|---|
| 1,834,234 | Zinsitz | Dec. 1, 1931 |
| 1,904,073 | O'Connor | Apr. 18, 1933 |
| 2,024,184 | Ritchie | Dec. 17, 1935 |
| 2,090,089 | Wiegand | Aug. 17, 1937 |
| 2,146,102 | Wiegand | Feb. 7, 1939 |
| 2,168,690 | Uksila | Aug. 8, 1939 |
| 2,177,042 | Michael | Oct. 24, 1939 |
| 2,443,147 | Ritchie | June 8, 1948 |
| 2,577,458 | Gaiptman | Dec. 4, 1951 |
| 2,849,047 | Lamont et al. | Aug. 26, 1958 |
| 2,931,414 | Jankowski | Apr. 5, 1960 |
| 2,944,579 | Kamm | July 12, 1960 |
| 2,989,999 | Holbrook et al. | June 27, 1961 |

FOREIGN PATENTS

| | | |
|---|---|---|
| 1,069,517 | France | Feb. 10, 1954 |

OTHER REFERENCES

Construction Methods and Equipment, April 1958, page 130.